Oct. 15, 1963    W. B. TEMPLETON ET AL    3,107,090
SHEET DRIVE AND REGISTERING APPARATUS
Filed Feb. 2, 1961    4 Sheets-Sheet 1

INVENTORS.
WILLIAM B. TEMPLETON.
NICHOLAS KONDUR JR
BY
Harry R. Dumont
ATTORNEY.

Oct. 15, 1963 W. B. TEMPLETON ET AL 3,107,090
SHEET DRIVE AND REGISTERING APPARATUS
Filed Feb. 2, 1961 4 Sheets-Sheet 3

INVENTORS.
WILLIAM B. TEMPLETON.
NICHOLAS KONDUR JR.
BY
Harry R. Dumont
ATTORNEY.

INVENTORS.
WILLIAM B. TEMPLETON,
NICHOLAS KONDUR JR.
BY
Harry R. Dumont
ATTORNEY

United States Patent Office 3,107,090
Patented Oct. 15, 1963

3,107,090
SHEET DRIVE AND REGISTERING APPARATUS
William B. Templeton, Northville, and Nicholas Kondur, Jr., Garden City, Mich., assignors to Burroughs Corporation, Detroit, Mich., a corporation of Michigan
Filed Feb. 2, 1961, Ser. No. 86,707
5 Claims. (Cl. 271—58)

This invention relates generally to sheet transport and printing systems and more particularly to a sheet drive and registering apparatus therefor.

In many types of printing and encoding machines it is necessary to provide a rapid and accurate means for registering sheets relative to the printing mechanism preparatory to a print operation.

It is therefore an object of this invention to provide mechanism operable both to drive a sheet both into and away from a print position through a selectively variable path.

It is a further object of this invention to provide a sheet registering apparatus which is effective to simultaneously drive a sheet in two directions at the same time to accomplished registration of the sheet.

It is an additional object of this invention to provide a sheet registering apparatus which is operable in a single continuous path of movement in the sheet feed plane without requiring intermediate pre-registration stops.

It is an additional object of this invention to provide a sheet registering apparatus in which the sheet is confined within a sheet feed plane at all times during movement to prevent planar distortion or buckling of the sheet.

It is an additional object of this invention to provide a sheet drive apparatus in which the driving force is imparted to the sheet at a relatively restricted area both to prevent undue wear and mutilation of the sheet, and to provide the maximum area of the sheet feed plane in which a sheet may be driven by a pair of driving members concurrently.

It is a still further object of this invention to provide a sheet drive apparatus in which the path of movement is selectively controlled by the relative speeds of rotation of a pair of drive elements.

It is a further object of this invention to provide an apparatus for sheet feeding whereby the direction of sheet travel can be selectively varied to any direction within a sheet feed plane by selectively varying the direction of rotation and the speed of rotation of drive members in frictional engagement with the sheet without rotating the sheet about itself.

The above and other objects and advantages of the present invention will become more apparent upon consideration of the following detailed specification and accompanying drawings wherein is fully disclosed a preferred embodiment of the invention.

Figure 1:
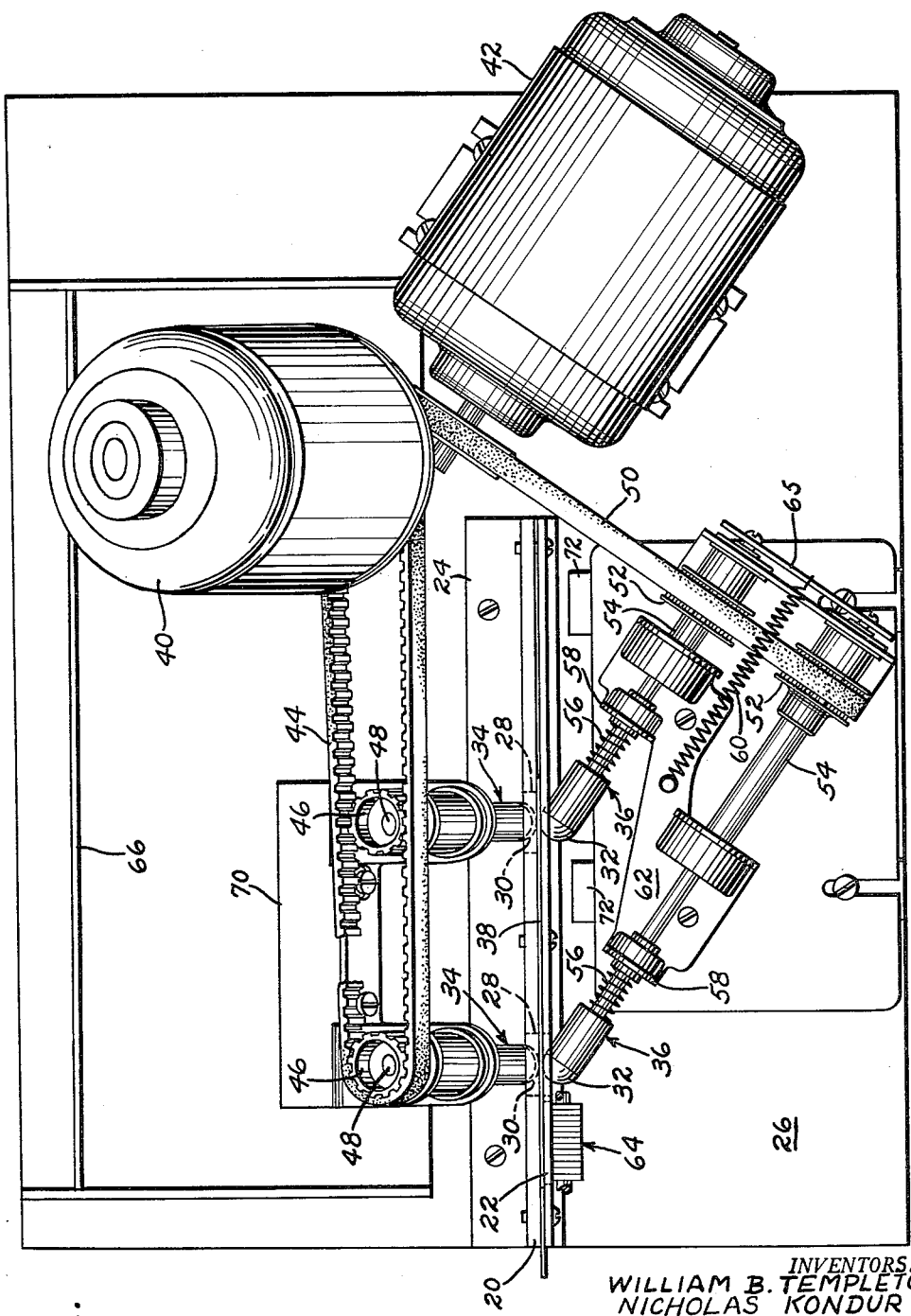
FIG. 1 is a plan view of the drive and registering apparatus.

With reference to the drawings and initially to FIG. 1 thereof, there is illustrated a sheet registration station. The sheet feed plane is defined by a pair of spaced and parallel guide plates 20 and 22 which may be of a transparent material to afford operator visibility at all times. Plates 20 and 22 are mounted in a vertical upstanding position on plate 24 which in turn is fixed to base 26. A pair of apertures 28 are provided through each guide plate to admit entry of the drive means into engagement with the sheet as fed. The drive means provided are spherical drive members 30 which are opposed by second spherical drive members 32. Each of the drive spheres 30 is mounted at the end of a shaft 48. Each of the drive spheres 32 is mounted at the end of a shaft 54. As indicated by FIG. 1 the drive spheres are maintained in opposed tangential contact and in frictional driving engagement with the interposed sheet 38 such that the vector of a normal component of force perpendicular to the frictional force on interposed sheet 38 exerted by drive sphere 30 is co-normal, that is to say collinear but opposite in direction, to the vector of a normal component force exerted by a drive sphere 32 on sheet 38; and each one of the shafts 32 are skew, or noncoplanar, with respect to each of shafts 48.

Each pair of drive spheres has a common drive means provided therefor. Motor 40 provides a rotative drive for drive spheres 30 through toothed belt 44 and toothed pulleys 46 fixed to the upper end of shafts 48. A single disc clutch 34 of a type well known in the art is provided at the end of each shaft 48. A clutch spring 68 is biased in a state of compression on shaft 48. In a like manner motor 42 provides a common rotation drive for drive spheres 32 through toothed belt 50, toothed pulleys 52 and shafts 54. A single disc clutch 36 with spring 56 is likewise provided at the forward end of each shaft 54. Motors 40 and 42 are D.C. motors which are readily reversible with change of direction of the field current applied, as well as readily selectively variable in speed of rotation by change of magnitude of the field current applied. Thus the speed and the direction of rotation of motors 40 and 42, that is to say the dyad of rotation of motors 40 and 42, are readily selectively variable. Means for biasing drive spheres 32 into frictional engagement with the sheet 38 includes a tensioning spring 60 which is coupled at its forward end to plate 65. Plate 65 is thus urged forwardly to maintain drive sphere 32 into yielding frictional engagement with the sheet 38. It is further indicated by FIG. 1 that the shafts 56 are maintained in parallel relationship to each other but in substantially misaligned or skew relationship to parallel shafts 48. A printer unit 64 is provided which is mounted on base 62 of the registration station in a fixed position. The printer unit includes a plurality of rotary indexed print wheels of a type well known in the art.

Figure 2:
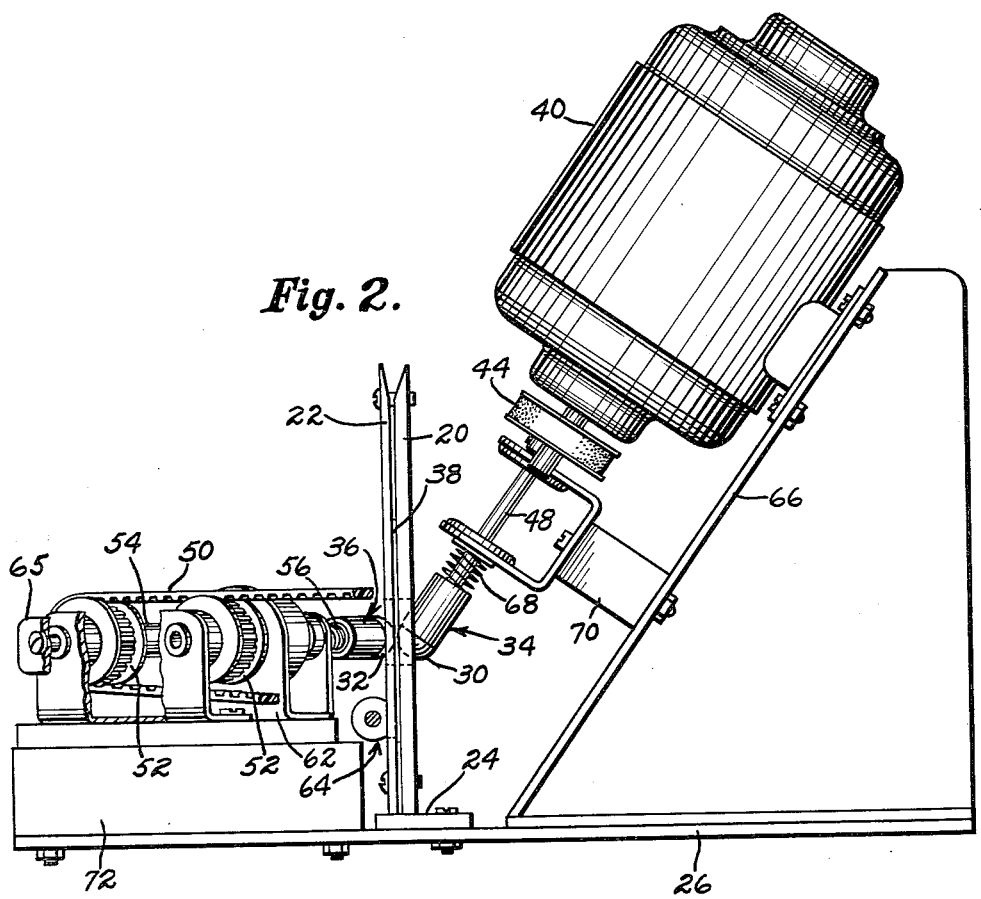
FIG. 2 is a right side elevation of the drive and registering apparatus.

FIG. 2 further illustrates the manner in which the driver apparatus is mounted relative to the registration and printer station. Motor 40 is mounted on inclined bracket 66 which in turn is fixed to base 26. Journal support 70 provides support for shaft 48. Also shown in FIG. 2 is the support bracket 72 for the mechanism associated with drive sphere 32.

Figure 3:
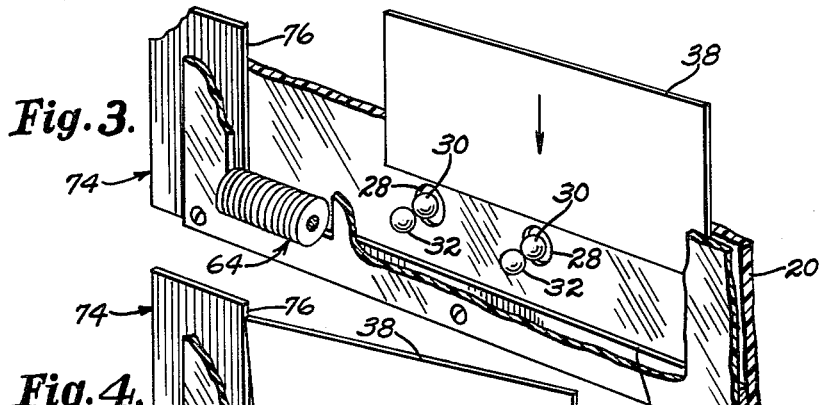
FIGS. 3–6 are diagrammatic views with parts broken away showing the various stages of operation of the drive and registering apparatus.

FIG. 3 illustrates the stage of operation at which the sheet 38 is dropped manually or driven by associated transport mechanism, not shown, into the registration and print station. Also shown is the edge registration member provided for accurate alignment of the check relation to the printer unit 64. For this purpose, registration member 74 is provided with side registration surface 76 and bottom registration surface 78.

Figure 4:
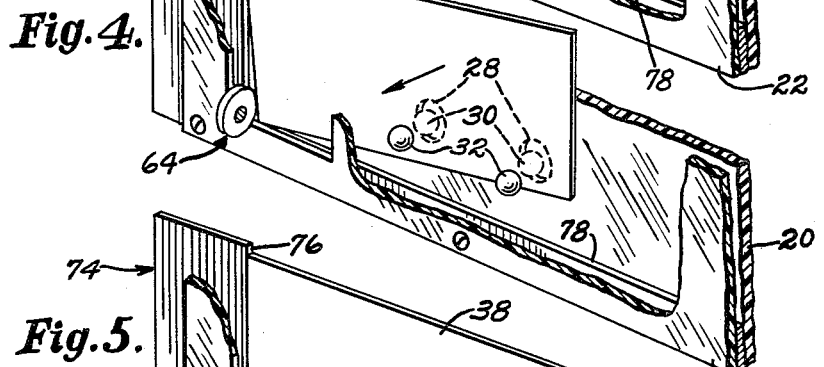

FIG. 4 shows the sheet 38 engaged between the opposing drive spheres 30 and 32. The sheet is being driven simultaneously leftwardly and downwardly. The arrow shows the resultant force vector which approximates the direction of travel of the sheet 38.

Figure 5:
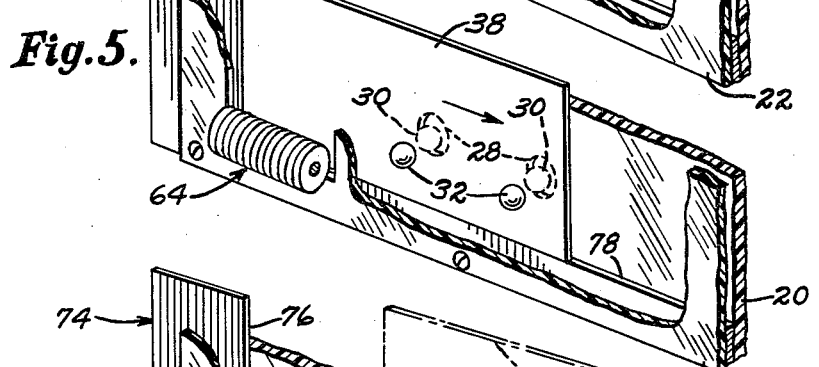

FIG. 5 shows the sheet in its registered print position. The arrow indicates the rightward direction of travel of the sheet 38 as it is being initiated.

Figure 6:
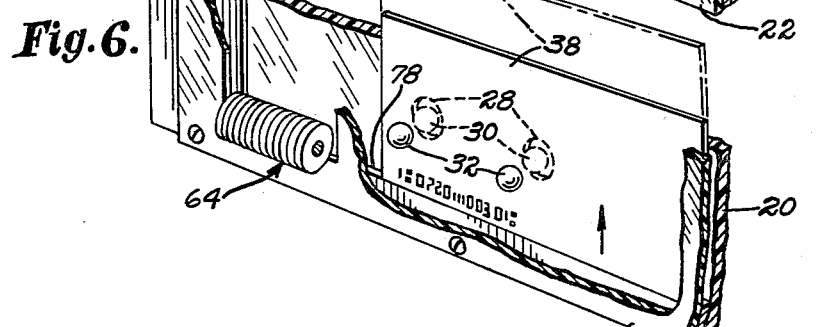

FIG. 6 shows the sheet 38 at the right-hand limit of its travel with movement being initiated by the drive spheres 32 in an upward direction.

Figure 7:
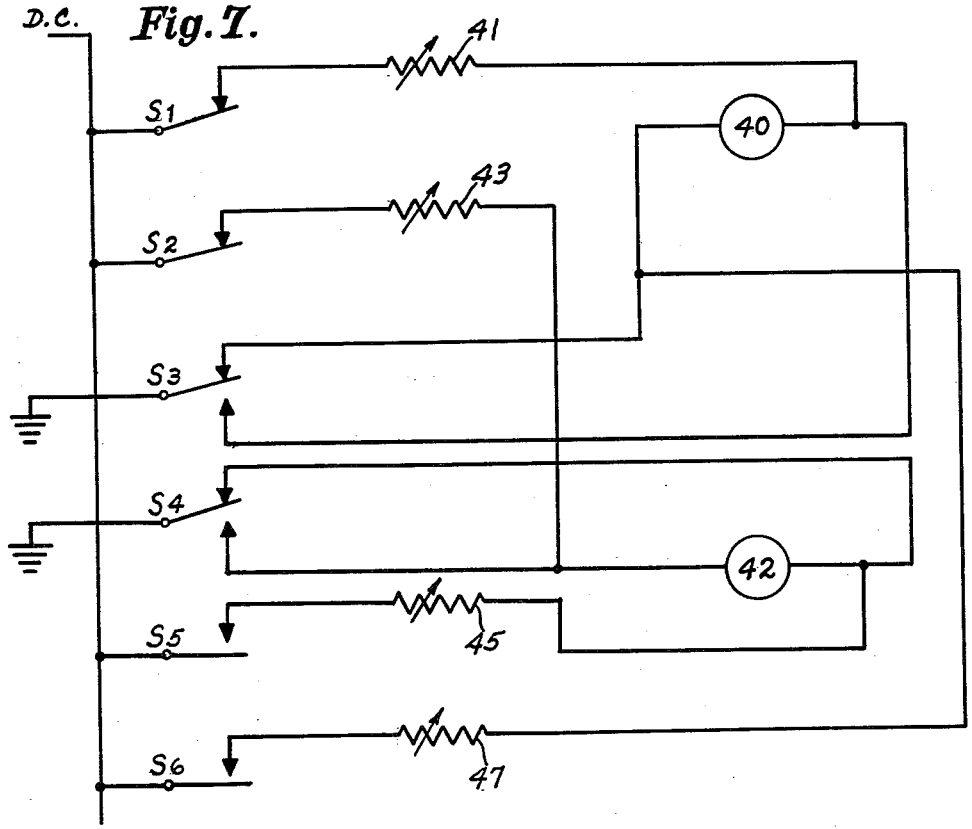
FIG. 7 is a control schematic showing the manner in which a feed and registering operation is accomplished.

FIG. 7 illustrates the basic control circuit utilized to control the rotation of drive motors 40 and 42. Cam-operated switches 1, 3 and 6 are coupled between the D.C. voltage supply and serve to reverse selectively the direction of current through the field of motor 40 and consequently operate to control the direction of rotation of drive spheres 30. Variable resistors 41 and 47, 43 and 45 are provided in series with motors 40 and 42, respectively. It should be noted that the orientation of shafts 48 which drive spheres 30 controls the direction of drive imparted to the sheet 38. Sheet 38 is driven leftwardly or rightwardly depending on whether the direction of actuation of the shafts 48 is clockwise or counterclockwise. Cam-operated switches 2, 4 and 5 are coupled between the D.C. voltage supply and ground and serve to reverse the direction of current through motor 42 and hence control the direction of rotation of driver sphere 32. The orientation of shafts 54 which carry drive spheres 32 control the direction of drive imparted to the sheet. Sheet 38 is driven upwardly or downwardly depending on whether the direction of rotation of shafts 54 is clockwise or counterclockwise.

Figure 8:
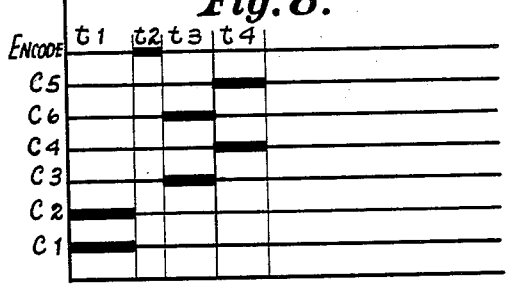
FIG. 8 is a timing diagram showing the sequence of cam operation.

FIG. 8 illustrates the time sequence of operation of the cams $C_1$–6 which control the opening or transfer of correspondingly numbered switches $S_1$–6.

Figure 9:
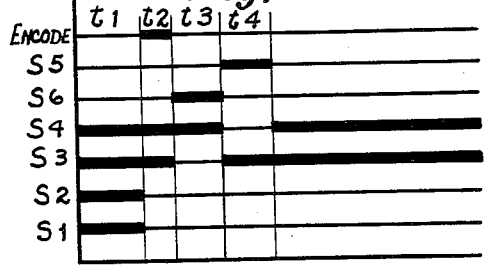
FIG. 9 is a timing diagram showing the sequence of switch actuation.

FIG. 9 illustrates the time sequence of operation of the switches $S_1$–6.

Figure 10:
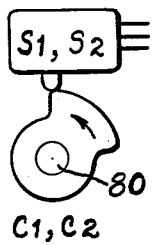
FIGS. 10–12 show the physical configuration of the cams which control the operation of the switches in the control schematic of FIG. 7.
Figure 11:
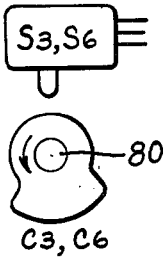
Figure 12:
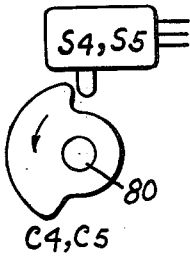

FIGS. 10–12 show the physical configuration of cams $C_1$–6 as mounted on control cam shaft 80. One revolution of 360° of cam shaft 80 will control one feed, print and eject cycle of the registration and print station. Since cams $C_1$ and $C_2$ are substantially similar they are shown in FIG. 10. For the same reason, cams $C_3$ and $C_6$ are both illustrated in FIG. 11, and cams $C_4$ and $C_5$ are shown in FIG. 12.

Description of Operation

When the document 38 is manually dropped or mechanically driven into the registration and feed station, the cycle of operation is begun as by energizing a single revolution clutch to initiate a single counterclockwise rotation of cam shaft 80. The operation may be best described with reference to FIGS. 8, 9 and 10. During time $t_1$, normally closed switches $S_1$ and $S_2$ are held closed by cams $C_1$ and $C_2$. Switches $S_3$ and $S_4$ have their movable contacts in the raised positions as indicated in FIG. 7. The rotation of motor 40 serves to drive shafts 48 in a counterclockwise direction. Thus, drive spheres 30 are driving the document in with a force of translation in a leftward direction. Also during time $t_1$, motor 42 has a rotation which serves to drive shafts 54 in a a counterclockwise direction. Thus, drive spheres 32 are driving the document with a force of translation in a downward direction. The direction of the resultant force vector is indicated by the arrow in FIG. 4. As soon as document 38 is limited against side registration surface 76, the compression of springs 68 will engage clutches 34 to interrupt the drive from shafts 48 to drive spheres 30. As soon as document 38 abuts against bottom registration surface 78, the compression of springs 56 will engage clutches 36 to interrupt the drive from shafts 54 to drive spheres 32.

During $t_2$, an operation of encoder 64 may be initiated in the usual manner to accomplish a print or encoding operation. Switches $S_1$ and $S_2$ are opened by cams $C_1$ and $C_2$ during this time period.

During $t_3$, removal of the document in a rightward direction is initiated. To achieve this movement the direction of motor 40 must be reversed. Cam $C_3$ transfers the movable contact of switch $S_3$ to its lower stationary contact and cam $C_6$ closes switch $S_6$ so that the current path to motor 40 is reversed and the direction of rotation of shafts 48 is reversed. Drive spheres 30, therefor, commence to drive the document 38 rightwardly as shown in the arrow in FIG. 5.

At time $t_4$, normally open switch $S_5$ is closed by cam $C_5$, and cam 4 moves the contact of switch $S_4$ to its lower stationary contact to complete the current path to motor 42 in a reverse direction. Thus, motor 42 drives shafts 56 with a clockwise rotation to cause drive spheres 32 to drive the document in an upward direction as shown by the arrow in FIG. 6. At the end of $t_4$ it should be also noted that cams $C_3$ and $C_4$ condition switches $S_3$ and $S_4$ to their starting position and that all the control cams have returned to their original positions after one complete cycle of rotation of control cam shaft 80.

While the environment in which the present invention has been illustrated is simple and straightforward in nature, it will be appreciated that the drive mechanism provided is extremely versatile and readily adaptable to a great number of variations by one skilled in the art. It will be apparent that the control of the speed of rotation of hte drive spheres may be varied by a number of control means—both mechanical and electrical—as for example, by varying the field current of motors 40 and 42 by means of variable resistors 41, 43, 45 and 47.

What is claimed is:

1. Means for feeding and registering a sheet in two directions comprising means defining a sheet feed plane and a sheet registration surface in the path of each feed direction, an opposed pair of sheet engaging drive members of circular cross section yieldably biased against each other and located on opposite sides of the sheet feed plane in frictional driving engagement with a sheet received therebetween, each of said sheet engaging drive members forming a sheet back-up member for the other and being mounted for independent rotation on a different one of a pair of mutually skew rotational axes to impart a translatory driving motion in a different one of said feed directions to the sheet received therebetween, reversible drive means for rotating said sheet engaging drive members about their axes, and means coupled to and controlling the direction of rotation of said drive means.

2. Means for feeding and registering a sheet in two direction comprising means defining a sheet feed plane and a sheet registration surface in the path of each feed direction, an opposed pair of sheet engaging drive members of circular cross section yieldably biased against each other and located on opposite sides of the sheet feed plane in frictional driving engagement with a sheet received therebetween, each of said sheet engaging drive members forming a sheet back-up member for the other and being mounted for independent rotation on a different one of a pair of mutually skew rotational axes to impart a translatory driving motion in a different one of said feed directions to the sheet received therebetween, a pair of reversible drive means each supplying a separate rotative drive to a different one of said sheet engaging drive members, and means coupled to and selectively controlling the direction of rotation of each of said drive means.

3. Means for feeding and registering a sheet in two directions comprising means defining a sheet feed plane and a sheet registration surface in the path of each feed direction, an opposed pair of sheet engaging drive members of circular cross section yieldably biased against each other and located on opposite sides of the sheet feed plane in frictional driving engagement with a sheet received therebetween, each of said sheet engaging drive members forming a sheet back-up member for the other and being mounted for independent rotation on a different one of a pair of mutually skew axes to impart a translatory driving motion in a different one of said feed directions to the sheet received therebetween, a pair of variable speed drive means each supplying a separate rotative drive to a different one of said sheet engaging drive members, and speed varying control means coupled to and selectively varying the speed of said drive means.

4. Means for feeding and registering a sheet in two directions comprising means defining a sheet feed plane and a sheet registration surface in the path of each feed direction, an opposed pair of sheet engaging drive members of circular cross section yieldably biased against each other and located on opposite sides of the sheet feed plane in frictional driving engagement with a sheet received therebetween, each of said sheet engaging drive members forming a sheet back-up member for the other and being mounted for independent rotation on a different one of a pair of mutually skew rotational axes to impart a translatory driving motion in a different one of said feed directions to the sheet received therebetween, drive means for rotating said sheet engaging drive members, and a pair of coupling means each coupling a different one of said sheet engaging drive members to said driving means and responsive to the engagement of the sheet with a different one of said registration surfaces for interrupting the rotative drive supplied from said driving means to the sheet engaging drive member driving the sheet against the engaged registration surface.

5. Means for feeding and registering a sheet in two directions comprising means defining a sheet feed plane and a sheet registration surface in the path of each feed direction, an opposed pair of sheet engaging drive members of circular cross section yieldably biased against each other and located on opposite sides of the sheet feed plane in frictional driving engagement with a sheet received therebetween, each of said sheet engaging drive members forming a sheet back-up member for the other and being mounted for independent rotation on a different one of a pair of mutually skew rotational axes to impart a translatory driving motion in a different one of said directions to the sheet received therebetween, reversible drive means for rotating said sheet engaging drive members, a pair of coupling means each coupling a different one of said sheet engaging drive members to said driving means and responsive to the engagement of the sheet with a different one of said registration surfaces for interrupting the rotative drive supplied from said driving means to the sheet engaging drive member driving the sheet against the engaged registration surface, and means coupled to and controlling the direction of rotation of said drive means.

References Cited in the file of this patent

UNITED STATES PATENTS

| | | |
|---|---|---|
| 1,420,223 | Evans et al. | Sept. 26, 1922 |
| 1,646,652 | Luley et al. | Oct. 25, 1927 |
| 2,767,982 | Noon | Oct. 23, 1956 |
| 2,792,045 | Ingels | May 14, 1957 |
| 2,798,565 | Rosenthal et al. | July 9, 1957 |
| 2,845,122 | Lake et al. | July 29, 1958 |
| 3,015,486 | Weidenhammer | Jan. 2, 1962 |

FOREIGN PATENTS

| | | |
|---|---|---|
| 376,554 | Great Britain | July 14, 1932 |
| 661,939 | France | Mar. 12, 1929 |